United States Patent [19]
Yun

[11] Patent Number: 5,064,212
[45] Date of Patent: Nov. 12, 1991

[54] BICYCLE UTILIZING THE VECTOR SYSTEM

[76] Inventor: Jae Shin Yun, 103 Cambridge La., Glendale Heights, Ill. 60139

[21] Appl. No.: 634,592

[22] Filed: Dec. 27, 1990

[51] Int. Cl.[5] .................. B62K 3/02; B62K 19/00; B62M 1/02
[52] U.S. Cl. .................. 280/261; 280/270; 280/281.1; D12/111
[58] Field of Search .................. 280/261, 270, 281.1, 280/263; D12/111

[56] References Cited
U.S. PATENT DOCUMENTS

D. 312,229  11/1990  Yun .................. D12/111
4,995,627   2/1991  Yun .................. 280/261

Primary Examiner—Mitchell J. Hill
Attorney, Agent, or Firm—Birch, Stewart, Kolasch & Birch

[57] ABSTRACT

A bicycle which comprises a triangular frame, a front fork including a vectorial angle of 90°, the length of the upper portion of the front fork being longer than that of the lower portion of the front fork, wherein the vertical arm extending from the lower portion end thereof, and a W-shaped configured rear fork which has a pair of vectorial angles of 90°, the lengths of the upper and lower portions of the rear fork being shorter than those of the upper and lower middle portions of the rear fork, whereby the bicycle is accelerated in the forward moving speed by the bicycle rider.

11 Claims, 1 Drawing Sheet 5,064,212

BICYCLE UTILIZING THE VECTOR SYSTEM

BACKGROUND OF THE INVENTION

1. Field of the Invention

The present invention relates to a bicycle utilizing the vector system and more particularly, to a bicycle including a frame which has a triangle configuration and front and rear forks which have a vectorial angle of 90°, respectively, wherein the rear fork has a W-shaped configuration, whereby the bicycle may be driven with little effort being required by the bicycle rider.

2. Description of the Prior Art

Many types of bicycles are known in the art which include a frame having a pedal sprocket, a rear fork, and a front fork wherein the front and rear forks are gradually slope away from each other such as the sides of a trapezoid. However, a weight on the bicycle cannot be converted into kinetic energy since the weight adds to the gravity of the rear wheel of the bicycle so that such bicycles are driven with much effort being required by the bicycle rider.

In order to avoid such problem, U.S. Pat. No. Des. 312,229, issued to the present inventor, discloses a combined bicycle frame and fork unit. Also, the present inventor is prosecuting corresponding U.S. Pat. application Ser. No. 07/491,201, filed Mar. 9, 1990, now allowed, which disclosed a bicycle including a frame which has a triangle configuration and front and rear forks which have a vectorial angle of 90°, respectively, and which face to each other such as a hexagon. However, this bicycle utilizing the vector system is practically ineffective.

SUMMARY OF THE INVENTION

Accordingly, it is an object of the present invention to provide an improved bicycle for accelerating the forward moving speed thereof.

Another object of the present invention is to provide a bicycle having a triangular frame and forks which includes a front fork and a rear fork that are formed so that a weight on a top bar of the bicycle becomes a component force since the upper portions of the front and rear forks are directed away from each other.

A further object of the present invention is to provide a bicycle including a front fork which has a vectorial angle of 90°, wherein the length of the upper portion of the front fork is longer than that of lower portion of the front fork, and a vertical arm extending from the lower portion end of the front fork, whereby the front fork may be used to create a gravitational potential vector energy to be transformed into the forward moving kinetic energy for the bicycle.

Yet another object of the present invention is to provide a bicycle including a W-shaped configured rear fork which has a pair of vectorial angles of 90°, wherein the lengths of the upper and lower portions of the rear fork is shorter than those of the upper and lower middle portions of the rear fork, whereby the rear fork may be used to create a gravitational potential vector energy to be transformed into a component force and a resultant force of forward moving kinetic energy for the bicycle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a bicycle which comprises a triangular frame, a front fork including a vectorial angle of 90°, the length of the upper portion of the front fork being longer than that of the lower portion of the front fork, wherein the vertical arm extending from the lower portion end thereof, and a W-shaped configured rear fork which has a pair of vectorial angles of 90°, the lengths of the upper and lower portions of the rear fork being shorter than those of the upper and lower middle portions of the rear fork, whereby the bicycle is accelerated the forward moving speed by the bicycle rider.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
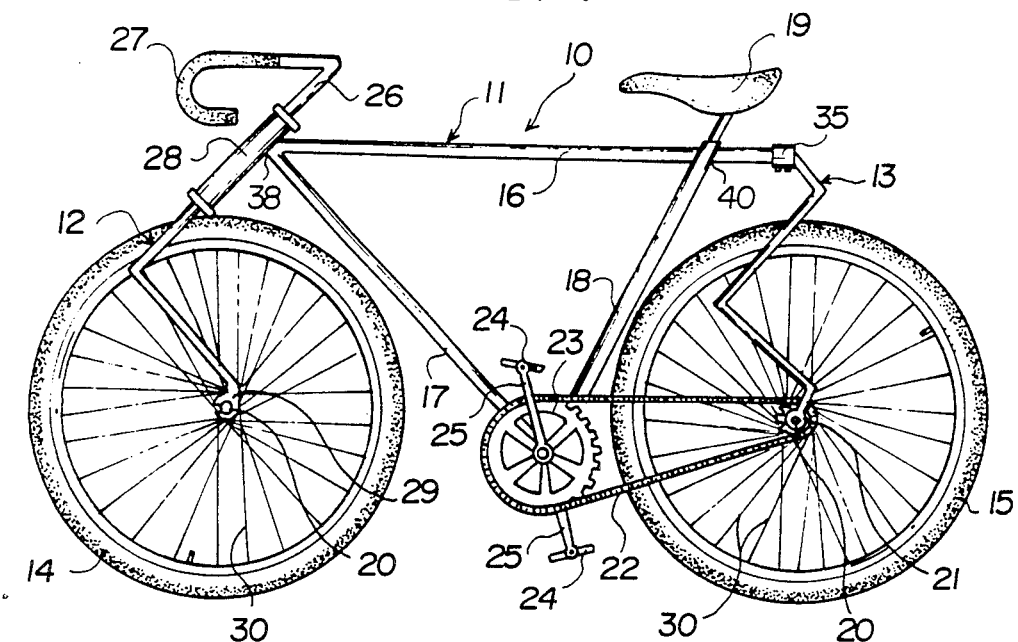
FIG. 1 is a side elevational view of the bicycle having a triangular frame, a front fork, and a rear fork of the present invention.
Figure 2:
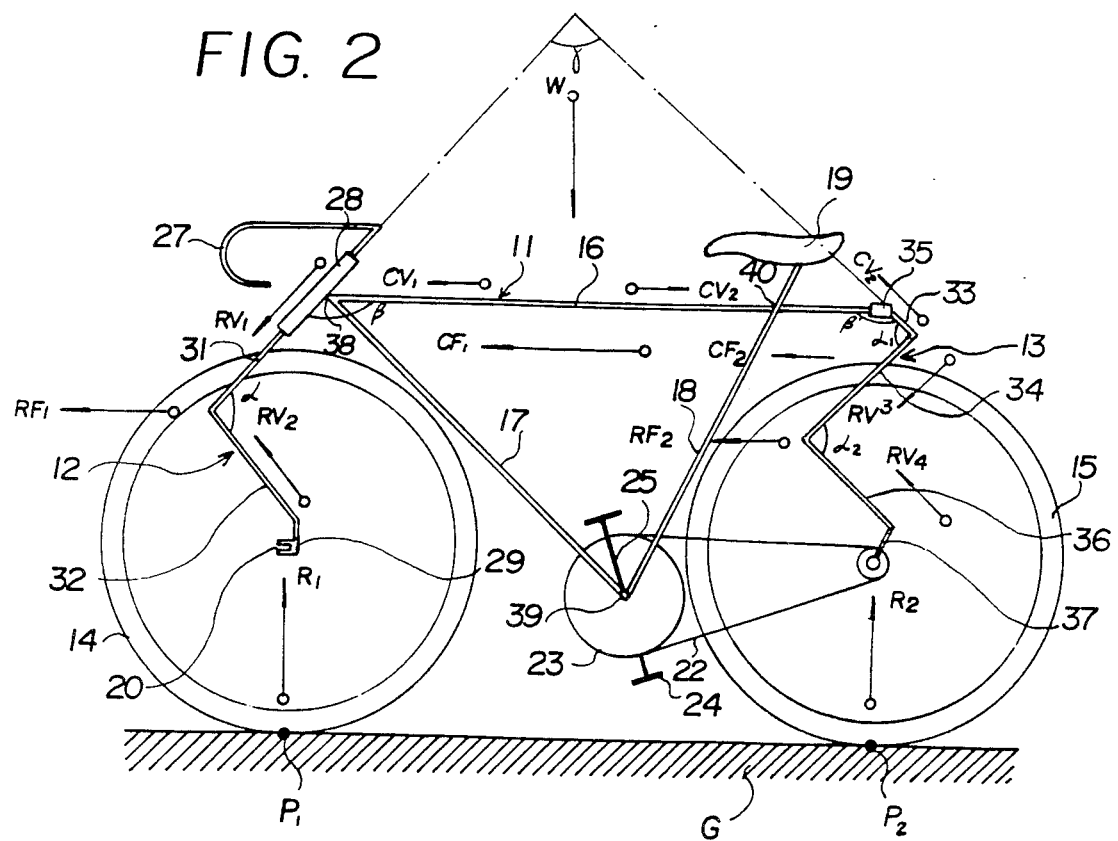
FIG. 2 is a somewhat diagrammatic side view of the bicycle having a triangular frame, a front fork, and a rear fork of the present invention showing the resultant and component forces of forward moving kinetic energy for the bicycle.

Referring now in detail to the drawings for the purpose of illustrating preferred embodiments of the present invention, the bicycle 10 as shown in FIGS. 1 and 2 comprises a triangular frame 11, a front fork 12 connected to a front joint portion 38 of the frame 11, and a rear fork 13 connected to a securing member 35 of the triangular frame 11, a front steering wheel 14 rotatably supported by the front fork 12, and a single driven rear wheel 15 rotatably supported by the rear fork 13.

The triangular frame 11 includes a top bar 16 jointed to a bottom bar 17 and an upright post 18 through the front joint portion 38 and a rear joint portion 40 thereof. And the bottom bar 17 is jointed to the upright post 18 through a bottom joint portion 39 of the triangular frame 11 (FIG. 2). The top bar 16 is provided with the securing member 35 for securing the rear fork 13 thereto. A seat 19 is adjustably mounted on the top of the upright post 18. The front steering and single driven rear wheels 14 and 15 have an axle 20 and a plurality of spokes 30, respectively. The axle 20 of the single driven rear wheel 15 is provided with a wheel sprocket 21 which is connected to the bottom joint portion 39 of the triangular frame 11 for accommodating a wheel chain 22. The wheel chain 22 is located over a pedal sprocket 23 rotatably mounted on sleeve bearings disposed in a cylinder on the bottom of the upright post 18 (not shown). The pedal sprocket 23 is connected to a pair of foot pedals 24 through a pair of pedal supports 25 which are operable by foot power to rotate the pedal sprocket 23 and thereby rotate the single driven rear wheel 15 to propel the bicycle 10 over the roadway, bike path, and the like. A suitable electric motor or internal combustion engine can also be used to drive the single driven rear wheel 15 (not shown). An upper tubular portion 28 of the front fork 12 extends and is pivotably connected to a handlebar 26 which extends left and right handlebar ends 27.

As shown in FIG. 2, the front and rear forks 12 and 13 have opposite vectorial angles $\alpha$, $\alpha_1$, and $\alpha_2$ of 90°, respectively. An angle $\gamma$ formed between the extension of the upper portions of the front and rear fork 12 and 13 is shown in FIG. 2 with dotted lines is 90°. The front fork 12 includes an upper portion 31 and a lower portion 32 wherein the length of the upper portion 31 is longer than that of the lower portion 32. However, the length of the upper and lower portions 31 and 32 of the front fork 12 can be the same as each other. The rear fork 13 has a W-shaped configuration and includes an upper portion 33, an upper middle portion 34, a lower middle portion 36, and a lower portion 37 wherein the length of the upper and lower portions 33 and 37 are shorter than that of the upper and lower middle portions 34 and 36, respectively. However, the length of the upper and lower middle portions 34 and 36 of the rear fork 13 can be the same as each other. Angles $\beta$ and $\beta'$ formed between the top bar 16 and the upper portions 31 and 33 of the front and rear forks 12 and 13 are each about 120° to 135°. From the end of lower portion 32 of the front fork 12, a vertical arm 29 extends. The end of the vertical arm 29 has a short length and is supported by the axle 20 of the front steering wheel 14. The upper portion 31 and lower portion 32 of the front fork 12 are parallel to the upper middle portion 34, and the upper portion 33 and the lower middle portion 36, respectively.

The angle $\gamma$ formed between the extension of the upper portions 31 and 33 of the front and rear forks 12 and 13 is substantially a right angle of 90°. Therefore, a weight W on the top bar 16 such as a weight of the rider and/or the load, is transferred to forward and backward pulling component forces by the upper portion 31 of the front fork 12 and the upper portion 33 of the rear fork 13 in the direction indicated by arrows $CV_1$ and $CV_2$. The component forces $CV_1$ and $CV_2$ are converted to the component force $CF_1$ to be transformed to the forward moving kinetic energy for the bicycle 10. In the front fork 12, the reaction force $R_1$ from a contacting point $P_1$ between the bottom of the front wheel 14 and the ground G transmits to the lower portion 32 of the front fork 12 in the direction indicated by arrow $RV_2$ from arrow $R_1$ through the vertical arm 29. Therefore, at the right angle $\alpha$, the component force $RV_1$ from the component force $CV_1$ and the reaction force $RV_2$ are jointed together and converted to the resultant force $RF_1$ to be the forward moving kinetic energy for the bicycle 10. In the rear fork 13, the reaction force $R_2$ from a contacting point $P_2$ between the bottom of the rear wheel 15 and the ground G transmits to the lower portion 37 and the lower middle portion 36 of the rear fork 13 in the direction indicated by arrow $RV_4$ from arrow $R_2$. Therefore, at the right angle $\alpha_2$, the component force $RV_3$ from the component force $CV_2$ and the reaction force $RV_4$ are jointed together and converted to the resultant force $RF_2$ to be the forward moving kinetic energy for the bicycle 10. And, at the right angle $\alpha_1$, the reaction force $CV_2'$ transmits the component force $CF_2$ and is added to the component force $CF_1$. Thus, the resultant force $RF_1$ and $RF_2$, and the component force $CF_1$ with $CF_2$ are summed and become the forward moving kinetic energy for the bicycle 10. Accordingly, the bicycle 10 utilizing the vector system of the present invention may be driven by the rider with little effort being required by the rider when compared with the prior art bicycles since the gravitational potential vector energy from weight on the bicycle may be transformed into the forward moving kinetic energy of the bicycle.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A bicycle having a front steering wheel and a single driven rear wheel which comprises:
    a triangular frame containing a front joint portion, a rear joint portion, and a bottom joint portion,
    a front fork with a first end rotatably connected to said front joint portion of the triangular frame, said front fork having a front bent portion with a 90° bend and an extended vertical arm at a second end thereof, said extended vertical arm attached to a front axle of said front steering wheel, whereby the front fork, the front bent portion, and the extended vertical arm are a composite structure so that the front fork is connected to the front steering wheel,
    a rear fork having a W-shaped configuration and outwardly connected to said rear joint portion of the triangle frame, said rear fork having a pair of rear bent portions with a 90° bend opposite and same as said front bent portion of said front fork, respectively, and defining an upper portion, an upper middle portion, a lower middle portion, and a lower portion wherein the length of the upper and lower portions are shorter than those of the upper and lower middle portions and said rear fork being pivotably attached to a rear axle of said single driven rear wheel,
    a handle bar extending from said first end of the top of the front fork through said front joint, and
    a driven chain engaged with a pedal sprocket which is mounted to said bottom joint of the triangle frame, said driven chain operatively engaged with a rear wheel sprocket which is mounted on said single driven rear wheel wherein the triangular frame, front fork, and rear fork of the bicycle comprise a vector system including component and resultant forces which collectively provide a forward force when weight is placed on the top of the triangular frame so that the bicycle may be smoothly driven forward with little effort being required by the rider.

2. The bicycle of claim 2, wherein the triangular frame includes a top bar and a bottom bar joined to an upright post.

3. The bicycle of claim 2, wherein the upright post is provided with a seat disposed on the top thereof.

4. The bicycle of claim 3, wherein the top bar is provided with a securing member for securing the rear fork thereto.

5. The bicycle of claim 1, wherein the front fork includes an upper portion and a lower portion which define the vectorial angle, wherein the length of said upper portion is longer than that of said lower portion.

6. The bicycle of claim 5, wherein the length of said upper portion of the front fork is same as to that of said lower portion of the front fork.

7. The bicycle of claim 5, wherein the upper portions of the front and rear fork extend to form and angle of 90°.

8. The bicycle of claim 1, wherein the length of the upper middle portion is same as to that of said lower middle portion of the rear fork.

9. The bicycle of claim 5, wherein the upper and lower portions of the front fork are in parallel to the upper middle portion, and the upper and lower middle portions of the rear fork, respectively.

10. The bicycle of claim 2, wherein the upper portion of the front fork extends from the front portion of the top bar at an angle of 120° to 135°.

11. The bicycle of claim 2, wherein the upper portion of the rear fork extends from the rear portion of the top bar at an angle of 120° to 135°.

* * * * *